Feb. 15, 1966 G. O. HUFSTADER 3,235,049

DIAPHRAGM SPRING FOR A CLUTCH ASSEMBLY

Filed Feb. 18, 1963 2 Sheets-Sheet 1

INVENTOR.

BY Gibson O. Hufstader

A. M. Heiter

ATTORNEY

Feb. 15, 1966 G. O. HUFSTADER 3,235,049

DIAPHRAGM SPRING FOR A CLUTCH ASSEMBLY

Filed Feb. 18, 1963 2 Sheets-Sheet 2

INVENTOR.
Gibson O. Hufstader
BY
A. M. Heiter
ATTORNEY

United States Patent Office 3,235,049

Patented Feb. 15, 1966

3,235,049
DIAPHRAGM SPRING FOR A CLUTCH ASSEMBLY

Gibson O. Hufstader, Warren, Mich., assignor to General Motors Corporation, Detroit, Mich., a corporation of Delaware Filed Feb. 18, 1963, Ser. No. 259,185
6 Claims. (Cl. 192—89)

This invention relates to clutch assemblies in general and more particularly to diaphragm spring clutch assemblies wherein the force effect of the spring is supplemented by centrifugal action.

Conventionally, diaphragm spring clutch assemblies include a coned or dished Belleville type diaphragm spring wherein the diaphragm spring is secured to a clutch cover and arranged so as to effect a biasing force against a clutch pressure plate to frictionally engage a driven disc disposed between the pressure plate and an engine driven flywheel. The biasing force effected by the diaphragm spring is normally relieved by a releasing force applied to an inner periphery of the diaphragm spring which in turn causes an outer periphery thereof to back off from the pressure plate thereby disengaging the driven disc.

There are several fundamental design considerations attendant to the design of an acceptable and efficient diaphragm spring for clutch assemblies. Among these considerations there is the problem of providing a diaphragm spring which will be sufficiently stiff to provide adequate biasing of the pressure plate at all operating engine or flywheel speeds and still be sufficiently flexible to react to a moderate biasing or relieving force. Furthermore, it is highly desirable to avoid the snap action tendency inherent in a coned or dished diaphragm spring because if the diaphragm spring is permitted to return to a driven disc engaging position too rapidly, the diaphragm spring will cause the pressure plate to grab the driven disc thereby resulting in a clutch operation which greatly impairs the life of the driven disc including the friction facings and causes erratic surges of power through the drive line. Among other considerations which should be considered is the relationship of the diaphragm spring to the over-all assembly and includes the providing of sufficient clearance between the diaphragm spring and the other components of the clutch assembly.

It has been found that these and other problems have been lessened by the utilization of diaphragm springs as shown by Kehrl 2,885,047 and Geyer 2,234,756 having release or spring fingers wherein weights are secured to a cetrain percentage of the spring fingers, which are either bent as in the case of Kehrl or straight as in the case of Geyer, in such a manner so that the centers of gravity of the weights are disposed out of a plane which passes through a line in the normal direction of the release fingers. The purpose of the weights is to provide a centrifugal effect which aids in the engagement of the driven disc when the driven disc is engaged and also promotes re-engagement of the driven disc when the driven disc is fully disengaged. The present invention intends to provide significant improvements in a diaphragm spring utilizing centrifugal action which will still further lessen the problems discussed previously.

The present invention includes a diaphragm spring having a dished or conical spring portion and spring fingers integral therewith wherein each of the spring fingers has a portion thereof bent or displaced in such a manner that the effective mass of the spring finger has its center of gravity so located with respect to the fulcrum of the diaphragm spring, and the axis of rotation of the diaphragm spring so as to produce a predetermined centrifugal effect to aid in driven disc engagement and promote re-engagement thereof.

An object of this invention is to provide a diaphragm spring having spring fingers wherein each of the spring fingers has a portion thereof bent out of its normal plane so as to produce a predetermined centrifugal effect to aid the diaphragm spring in driven disc engagement and promote re-engagement thereof.

Another object of this invention is to provide a diaphragm spring having spring fingers wherein a portion of each of the spring fingers is bent in such a manner that the effective mass of each of the spring fingers has its center of gravity removed from the normal plane of the spring fingers and so located with respect to the fulcrum of the diaphragm spring so as to produce a predetermined centrifugal effect.

Another object is to provide a diaphragm spring having a conical spring portion tapering toward an apex and integral spring fingers depending therefrom, the spring fingers each having an end portion thereof bent so that the center of gravity of each of the spring fingers is disposed outside of the included angle of the conical spring portion and so located relative to the fulcrum of the diaphragm spring such as to produce a predetermined centrifugal effect upon rotation of the diaphragm spring to aid in driven disc engagement and to promote driven disc re-engagement.

These and other objects of the invention will be more apparent from the following description and drawings of a preferred embodiment of the invention.

Figure 2A:
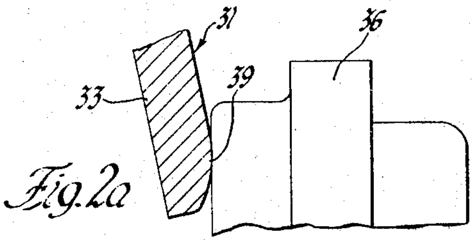

FIGURE 2*a* is an enlarged fragmentary view of one of the spring fingers of the diaphragm spring member sectioned along its longitudinal center axis and illustrating the configuration thereof at the point of engagement with the releasing bearing.

Figures 1, 2:
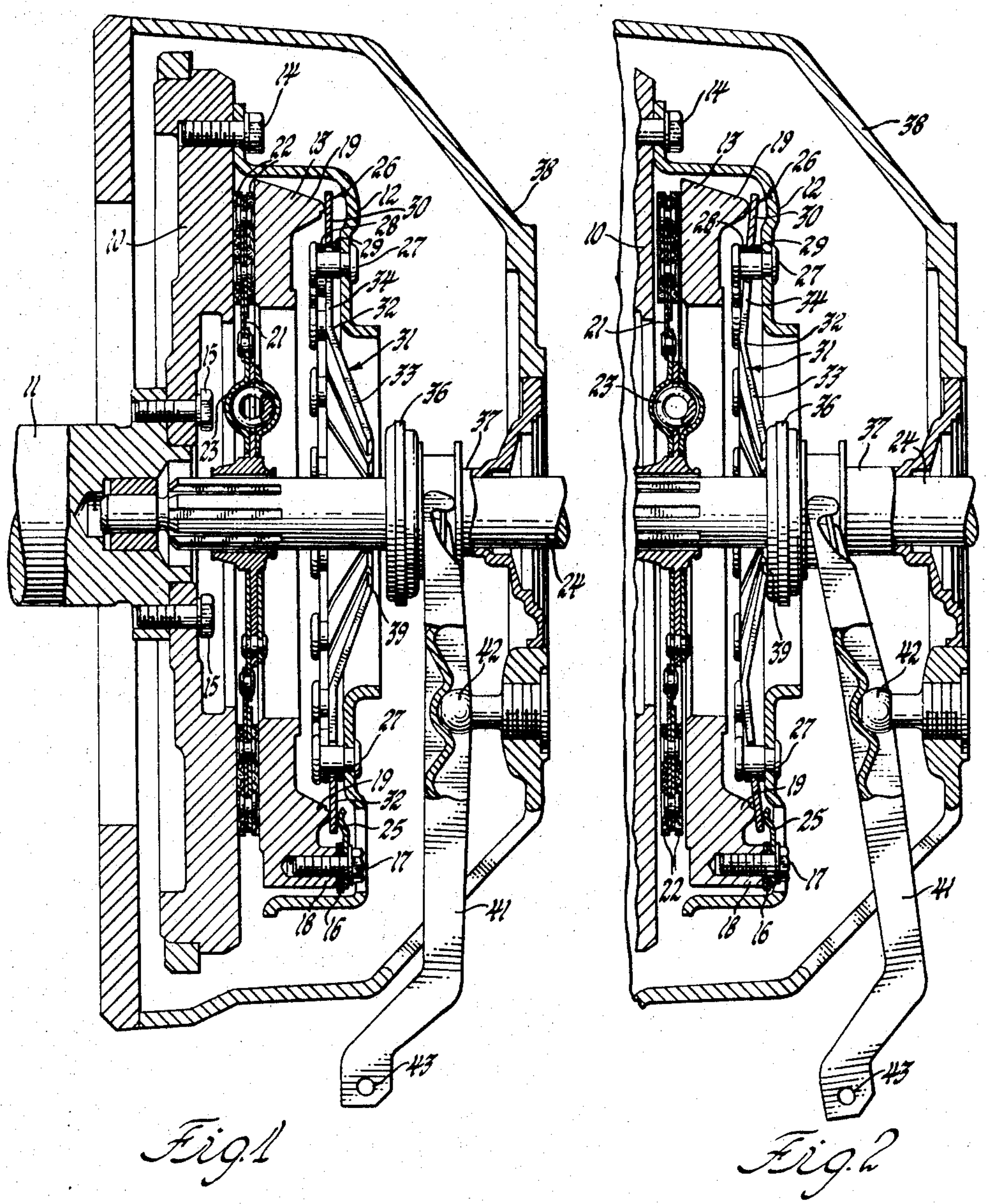
FIGURE 1 is a cross-sectional view of a clutch assembly employing a diaphragm spring member embodying features of this invention wherein the driven disc is shown to be engaged.
FIGURE 2 is a fragmentary cross-sectional view of the clutch assembly wherein the driven disc is shown to be disengaged.
Figure 3:
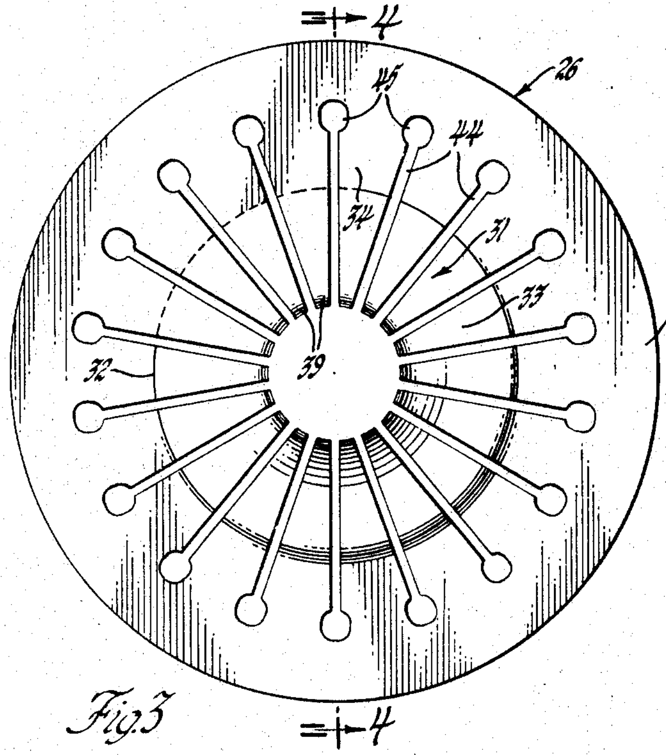

FIGURE 3 is a plan view of the diaphragm spring shown in FIGURES 1 and 2 prior to assembly.

Figure 4:
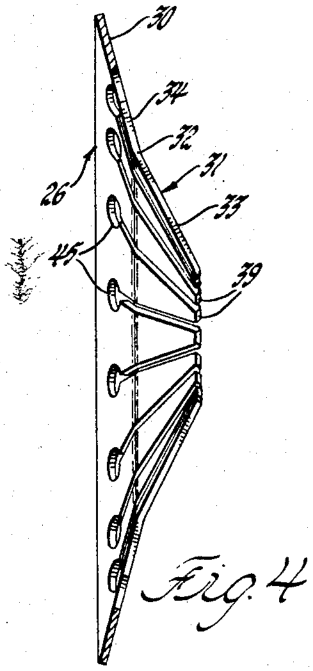

FIGURE 4 is a sectional view on the line 4—4 in FIGURE 3.

Figure 5:
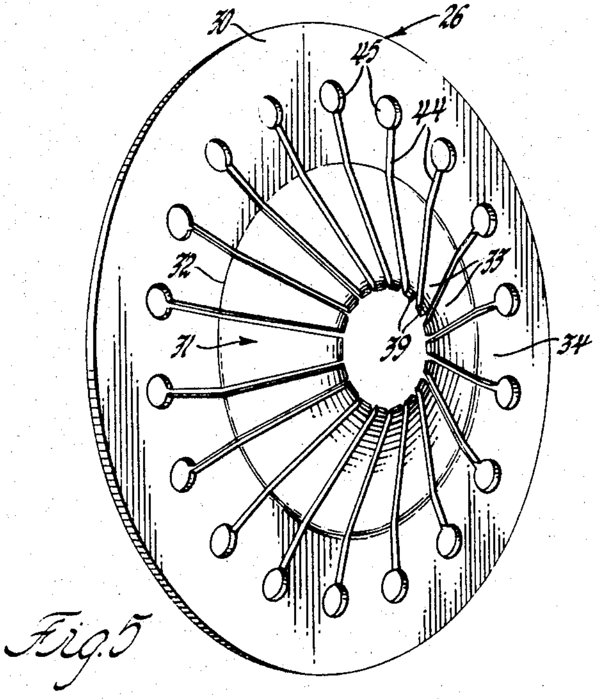

FIGURE 5 is a perspective view of the diaphragm spring shown in FIGURE 3.

Figure 6:
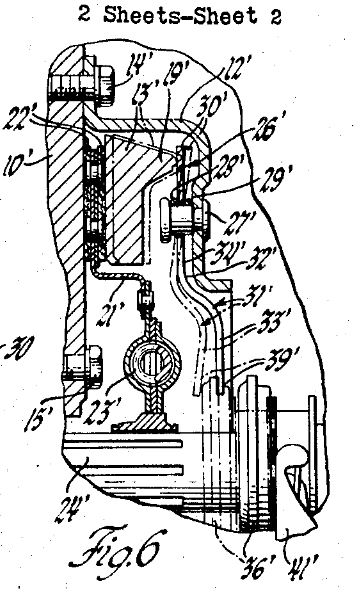

FIGURE 6 is a fragmentary cross-sectional view of a modified clutch assembly.

The clutch assembly comprises a flywheel 10 which is secured to an engine crankshaft 11 for rotation therewith by bolts 15. A clutch cover 12 and pressure plate 13 are secured to flywheel 10 for rotation therewith. Cover 12 is secured directly to the face of flywheel 10 as by bolts 14 circumferentially spaced therearound and pressure plate 13 is secured to flywheel 10 by a plurality of flexible drive straps 16 each of which has one end thereof secured by bolts 17 to projections 18 formed on pressure plate 13 and its other end secured by rivets or other suitable securing means, not shown, to cover 12. The straps 16 extend chordally across the pressure plate 13 and allow relative axial movement between flywheel 10 and pressure plate 13. The pressure plate 13 has its outer extremity formed to include ribs 19 circumferentially spaced therearound which are arranged so that they act as a centrifugal blower while rotating circulating air over the pressure plate 13. A driven disc 21 including inner and outer friction facings 22 on opposite sides thereof and cushioning springs 23 is splined to a driven shaft 24 and disposed between the flywheel 10 and pressure plate 13. The cover 12 encloses the driven disc 21 and pressure plate 13 and has a diaphragm spring member 26 embodying features of this invention mounted within the cover 12 on pivot pins 27. Pivot rings 28 and 29 are disposed on the inboard and outboard side respectively of diaphragm spring member 26 and around the pivot pins 27 to serve as a fulcrum for movement of the diaphragm spring member 26. Spring clips 25 are secured to the pressure plate 13 by the bolts 17 retaining the drive straps 16 and are adapted to retain the outer periphery of the diaphragm spring member 26 against the ribs 19 so that the pressure plate 13 is thereby adapted to be moved in conformity with movement of the outer periphery of diaphragm spring member 26. The diaphgarm spring member 26 includes a dished or conical spring portion 30 wherein the outer periphery thereof engages the ribs 19 to normally apply a force on the pressure plate 13 which in turn holds the driven disc 21 in engagement or contact with the flywheel 10 as shown in FIGURE 1. In the process of assembly, the conical spring portion 30 is flattened between its regions of contact at ring 29 and ribs 19, the ring 29 thus taking the reaction when the conical spring portion 30 acts on the pressure plate 13. The diaphgram spring member 26 is formed to include circumferentially arranged radially inwardly extending tapered release or spring fingers 31 depending from conical spring portion 30 substantially throughout the complete inner perimeter thereof and integral therewith. Each of the spring fingers 31 is bent as at 32 to provide a spring finger portion or end portion 33 which is bent away from a base portion 34, that is, out of the normal plane of the spring fingers 31 so that the center of gravity of each of the spring fingers 31 is disposed to the right of a plane drawn perpendicular to the axis of diaphragm spring member 26 passing through the line of contact between the ring 28 and diaphragm spring member 26, any point taken on the line of contact so defined being a fulcrum point or pivot point about which diaphragm spring member 26 pivots during clutch engagement and re-engagement operation. The end portions 33 of the spring fingers 31 are symmetrically disposed about the axis of diaphragm spring member 26 at a predetermined radial distance away therefrom and under the influence of centrifugal action produce forces acting about the fulcrum or pivot of diaphragm spring member 26, that is, the line of contact between ring 28 and diaphragm spring member 26, to add to the normal spring force of spring portion 30 when the driven disc 21 is engaged and when the driven disc 21 is disengaged produce forces about the fulcrum of diaphragm spring member 26 which tend to promote driven disc 21 re-engagement. By selecting the location of the center of gravity of each of the end portions 33 respective to the fulcrum of diaphragm spring member 26 and the axis of diaphragm spring member 26, the influence of centrifugal action can be predetermined as desired.

The clutch operating means comprise a throwout or release bearing 36 of the plain bearing type disposed about the driven shaft 24 and reciprocally mounted on a support member 37 secured to a casing 38 which surrounds the clutch assembly. The release bearing 36 is engaged with the ends of the spring fingers 31 by a lever 41 pivoted about a fulcrum 42 provided in casing 38. As shown in FIGURE 2*a* the ends of spring fingers 31 have a coined radius providing bearing surfaces 39. As the release bearing 36 is moved to the left to the clutch disengaged position the ends of spring fingers 31 move to the left and the bearing surfaces 39 slide along the flat face of the release bearing 36 and provide rolling surfaces for smooth engagement therebetween. The lever 41 is in turn operated by a clutch pedal mechanism or other suitable means, not shown, operatively connected to one end of the lever 41 as at 43 to effect the clutch release position or driven disc 21 disengagement, which is shown in FIGURE 2. The lever 41 is pivoted so as to move release bearing 36 axially in the direction of pressure plate 13 to pivot or flex the diaphragm spring member 26 about its fulcrum thus releasing the force or spring load effected by conical spring portion 30 on pressure plate 13.

In the operation of the proposed clutch assembly with the clutch engaged, the greater the engine speed, the greater is the centrifugal force effect or action on the effective masses of the spring fingers 31 to increase both their effective radius or moment arm about the fulcrum, ring 28, that is, the axial distance between the fulcrum and the centers of gravity of spring fingers 31 and their radius of rotation about the axis of diaphragm spring member 26 by bending the spring fingers 31 about the fulcrum. When the release bearing 36 is operated to engage the ends of spring fingers 31 thereby pivoting diaphragm spring member 26 about ring 28, the spring fingers 31 are moved axially to the left thus reducing the additive centrifugal force effect by reducing the radius of rotation of the centers of gravity of the spring fingers 31 and also the axial distance between their centers of gravity of their effective masses and the fulcrum, ring 28, about which diaphragm spring member 26 is pivoting. As viewed in FIGURE 2 with the driven disc 21 fully disengaged, the centers of gravity of the spring fingers 31 are axially to the right of a plane perpendicular to the axis of diaphragm spring member 26 passing through the pivot of the diaphragm spring member 26 thereby allowing the centrifugal force effect on the spring fingers 31 to act in a direction tending to promote re-engagement of the driven disc 21.

In the design shown, in the clutch engaged position, the centrifugal force acting on the conical spring portion 30 does not tend to pivot the diaphragm spring member 26 and in the clutch disengaged position the centrifugal force acting on the conical spring portion 30 tends to assist the centrifugal force acting on the spring fingers 31 to move the diaphragm spring member 26 to the engaged position. Thus, in springs made in accordance with this invention the component of centrifugal force tending to cause rotation as described above for the spring fingers is also true for the entire diaphragm spring.

Depending on design considerations, such as the strength properties of the material of the diaphragm spring member 26 and the included angle of the conical shaped spring portion 30, the shape of the release fingers 31 which determines the disposition of the effective mass thereof can be predetermined to effect the desired additive forces. By utilizing a diaphragm spring member, such as 26, there also can be provided, if desired, an initial clearance between the ends of the fingers 31 and the release bearing 36 when the rotative elements are at rest, the driven disc 21 is engaged and the release bearing 36 is maintained at some predetermined axial position on the support member 37, which can be utilized to limit the additive force effect of the spring fingers 31. This clearance limits the maximum additive force which can be effected by the centrifugal force effect on the effective masses of the release fingers 31 by observing that the clearance will determine the amount of increase both in the axial distance between the fulcrum of diaphragm spring member 26 and the centers of gravity of spring fingers 31 and the radius of rotation of the centers of gravity of spring fingers 31 about the axis of diaphragm spring member 26 that can occur. This is accomplished by permitting the ends of spring fingers 31, at some predetermined speed, to contact with the face of the release bearing 36 thereby preventing any further increase in the axial distance between the fulcrum of diaphragm spring member 26 and the centers of gravity of spring fingers 31 and the radius of rotation of the centers of gravity of spring fingers 31 and thus limiting the additive centrifugal force effect to a predetermined value. This has proved highly desirable in those instances where too large a bending force on the individual spring fingers would result in bending stresses beyond the limits of the spring material and also where the torque being communicated through the power line is to be limited to a predetermined value. In those instances where it is not desired to limit the centrifugal effect by having the spring fingers contact with the release bearing, sufficient clearance is provided whereby the spring fingers will not contact with the release bearing throughout the operating speed range. As shown in FIGURE 1, the spring fingers 31 do not contact the release bearing 36 in the operating speed range.

FIGURE 3 shows the diaphragm spring member 26 prior to assembly. The diaphragm spring member 26 comprises a conical spring portion 30 whose walls taper toward a common apex. The spring fingers 31 integral with the conical spring portion 30 are formed by slots 44 cut in the original conical section forming the conical spring portion 30 and openings 45 are provided circumferentially therearound to accept the pivot pins 27 which secure the diaphragm spring member 26 to the cover 12. As shown in FIGURES 4 and 5, the release fingers 31 formed are bent intermediate their length as at 32 so that the centers of gravity of their effective masses are disposed outside of the included angle of the conical spring portion 30 and are symmetrically disposed about the axis of diaphragm spring member 26. It is to be understood that the bend could occur at other points along the length of the spring fingers rather than at 32 including the point where they become distinctive from the spring portion 30 so long as the bend effected will, in the end result, locate the centers of gravity of the release fingers 31 such as to produce the desired centrifugal effect as set out in these teachings.

While the spring fingers 31 have been shown to be bent in a manner so as to be directed toward an apex different from the common apex of the spring portion 30 and thereby forming an over-all double conical shape when viewed in conjunction with the conical spring portion 30 such as shown in FIGURE 4, the spring fingers 31 can also be bent in a manner other than in the manner described above wherein they are directed toward an apex. By regarding the bend which occurs at 32 as determining an inflection point and drawing a line tangent to the spring surface at that point which also intersects the axis of the diaphragm spring member 26, it can be observed that if that portion of each of the spring fingers which is bent lies sufficiently radially outside of a plane, that is, the normal plane, passing through the aforementioned line, such that the bent portion serves to locate the centers of gravity of the spring fingers the desired distance away from the positions relative to both the fulcrum and axis of the diaphragm spring member 26, there will be effected the desired additive forces upon centrifugal action according to these teachings. With the above in mind, it can be seen that the spring fingers can be bent to assume a shape other than that which produces an even taper toward an apex thereby providing a flexibility in design of the configuration of the bent portion. This flexibility in design permits of a discretion on the part of a designer in providing adequate clearance between the diaphragm spring including spring fingers and the other parts of the clutch assembly.

There is a constant search for ways to provide a more compact engine and transmission unit. The modified clutch assembly shown in FIGURE 6 is similar to that shown in FIGURES 1 and 2 and with parts being identified by the same numerals primed. In this embodiment, the clutch assembly has been moved closer to the engine to provide a more compact unit and in doing so the space accommodation in the clutch assembly for the diaphragm spring member have been reduced. The diaphragm spring member 26' which embodies features of this invention illustrates its versatility in that it can be constructed to function in a very limited space. Referring to FIGURE 6, the axial position of shaft 2' and the point at which driven disc 21' is splined to shaft 2' are the same as that shown in FIGURES 1 and 2 and have not been changed, both because of the desirability of conformity at this stage of the assembly and also because of clearance requirements between cushioning springs 23' and the bolts 15' securing the flywheel 10' to the crankshaft, the latter becoming more apparent from the succeeding description. The flywheel 10' has been provided with a modified cross-sectional configuration such that its face which is contacted by inner friction facing 22' is relocated closer to the engine. The clearance between cushioning springs 23' and bolts 15' remains substantially the same as that shown in FIGURES 1 and 2 and the outer portion of driven disc 21' has been offset to the left at a point beyond the radial displacement of bolts 15' to provide clearance between the cushioning springs 23' and bolts 15' and to accommodate for the relocation of the face of flywheel 10' The cover 12' secured to the face of the flywheel and the clutch components supported by cover 12' have correspondingly been relocated closer to the engine. Because of the offset of driven disc 21', the clearance between the cover 12' and the cushioning springs 23' has been reduced by an amount equivalent to the offset of the driven disc or relocation of the face of the flywheel to allow for the reduced clearance. The spring fingers 31' of the diaphragm spring member 26' have been bent in accordance with the teachings of this invention and form the configuration shown which appears in the shape of an ogee curve when looking at the diaphragm spring member in cross section. In this instance, the bearing surfaces 39' on the ends of the spring fingers are substantially flat and are contacted by an outer rounded portion of the release bearing 36'. The members shown in solid lines depict the clutch engaged position and the members shown in dashed lines depict the clutch release position. Spring member 26' operates between the clutch engaged and release positions under the influence of centrifugal action in the same manner as the diaphragm spring member 26 previously described.

In the present invention by utilizing all of the spring fingers as active members in effecting additive centrifugal force, there is an equal distribution of bending forces taken by each of the spring fingers and therefore this reduces the load or bending forces borne by each spring finger. In clutches having weights fixed to a percentage of straight fingers wherein all the fingers are contactable with a throwout bearing or weights fixed to a percentage of the straight fingers which have been bent wherein only the fingers which remain straight are contactable with a throwout bearing, there are produced highly undesirable force effects because the effective masses of those fingers that remain straight necessarily lie in the same plane as the plane of the spring portion. Because the effective masses of those fingers which are straight lie in the same plane as that of the spring portion, there is the tendency of the straight fingers upon slightly excessive movement or flexing thereof in the direction of the spring portion to pass through the plane perpendicular to the axis of the spring intersecting the fulcrum of the spring portion thereby tending to promote snap action of the spring portion because of the centrifugal force effect on the effective masses of the straight fingers. In addition, the requirement that weights must be secured to the spring fingers requires piecemeal assembly and necessitates the providing of sufficient clearance in the driving and driven components to accommodate the particular size of the weights. In addition, in those clutch assemblies having a percentage of the straight fingers bent wherein weights are secured to the bent fingers to produce an additive centrifugal effect, it is inherent in such assemblies that there will be greater bending of the fingers having weights secured thereto than the fingers which remain straight and have no weights secured thereto. This necessarily results in an unequal distribution of the load borne by each of the fingers due to the centrifugal forces acting on the weights thereby setting up highly undesirable stress distribution in the spring portion and straight fingers, and furthermore requires that the straight fingers which are engaged by the release bearing must carry all the load including that of the bent weighted fingers which do not engage with the release bearing, when the release bearing is moved to release the spring pressure because the fingers which are bent are no longer active spring fingers. In those clutch assemblies having weights secured to a percentage of the straight spring fingers, there is also an unequal distribution of the load borne by each of the fingers because of the fact that the several fingers having weights secured thereto are necessarily carrying a centrifugal load over and above those fingers not having weights secured thereto. Even though all of the release fingers in the latter case are engaged by the throwout bearing, there is nevertheless an unequal stress distribution throughout the whole of the release fingers because of the unequal force distribution.

By utilizing a diaphragm spring, after the teaching of this invention particularly keeping in mind the disposition of the effective masses of the spring fingers and symmetry about the axis of the spring and the consideration that they be out of the plane of the dished or conical spring portion, it is possible to shape the spring fingers so as to provide both a controlled predetermined additive force under the influence of centrifugal action and sufficient clearance between the driving and driven components.

The above-described preferred embodiment is illustrative of the invention which may be modified within the scope of the appended claims.

I claim:

1. A diaphragm spring for a clutch assembly comprising:
- (a) a spring member having an annular portion tapering toward a common apex,
- (b) said annular portion having an inner perimeter,
- (c) spring fingers integral with and depending from said annular portion connected to said annular portion substantially throughout the complete inner perimeter of said annular portion,
- (d) each of said spring fingers having at least a major portion thereof bent away from said common apex so that the center of gravity of each spring finger is disposed a substantial distance outside of the smaller and included angle of said annular portion,
- (e) and said spring fingers substantially symmetrically disposed about the axis of said annular portion.

2. In a device for transmitting drive the combination of:
- (a) rotatable driving means,
- (b) rotatable driven means,
- (c) a diaphragm spring member pivotally mounted on and rotatable with said driving means prestressed to normally operatively engage said driving means with said driven means and pivotal to a final release position to fully disengage said driving means from said driven means,
- (d) spring fingers integral with said diaphragm spring member circumferentially disposed thereabout and extending inwardly from said diaphragm spring member operable to pivot said diaphragm spring member to said final release position,
- (e) release means adjacent said spring fingers operative to contact said spring fingers to pivot said diaphragm spring member to said final release position,
- (f) and each of said spring fingers having a greater portion thereof bent such that the center of gravity of each said spring finger is maintained at one side of the pivot of said diaphgram spring member so as to provide under the influence of centrifugal action thereon, a summational centrifugal force acting on said diaphragm spring member including said spring fingers to aid in engagement when the driving means are normally engaged with said driven means and to promote re-engagement in said final release position when said driving means are fully disengaged from said driven means.

3. In a device for transmitting drive the combination of:
- (a) rotatable driving means,
- (b) rotatable driven means,
- (c) a diaphragm spring member pivotally mounted on and rotatable with said driving means,
- (d) said diaphragm spring member including an annular spring portion tapering toward an apex prestressed to normally operatively engage said driving means with said driven means and pivotal to a final release position to fully disengage said driving means from said driven means,
- (e) said annular portion having an inner perimeter,
- (f) spring fingers integral with and depending from said annular spring portion connected to said annular portion substantially throughout the complete inner perimeter of said annular portion manually operable to pivot said diaphragm spring member to said final release position,
- (g) and each of said spring fingers having at least a major portion thereof bent so that the center of gravity of each spring finger is disposed a substantial distance outside of the included angle of said annular spring portion such that under the influence of centrifugal action thereon, the centrifugal force on each of said spring fingers effected thereby acts in a direction about the pivot of said diaphragm spring member to aid in engagement when said driving means are normally engaged with said driven means and to promote re-engagement in said final release position when said driving means are fully disengaged from said driven means.

4. In a device for transmitting drive the combination of:
- (a) rotatable driving means,
- (b) rotatable driven means,
- (c) a diaphragm spring member pivotally mounted on and rotatable with said driving means,
- (d) said diaphragm spring member including an annular spring portion tapering toward an apex prestressed to a nontapering configuration to normally operatively engage said driving means with said driven means and pivotal to a final release position to fully disengage said driving means from said driven means,
- (e) spring fingers integral with and depending from said annular spring portion operable to pivot said diaphragm spring member to said final release position,
- (f) release means adjacent said spring fingers operative to contact said spring fingers to pivot said diaphragm spring member to said final release position,
- (g) each of said spring fingers being bent at a point intermediate its length closely adjacent said annular spring portion so as to diverge radially outward from the axis of said annular spring portion such that under the influence of centrifugal action thereon the centrifugal force on each of said spring fingers effected thereby acts in a direction about the pivot of said diaphragm spring member to aid in engagement when the driving means are normally engaged with the driven means and to promote re-engagement in said final release position when the driving means are fully disengaged from the driven means,
- (h) and said release means and spring fingers having an initial clearance therebetween when said diaphragm spring member is normally operatively engaging said driving means with said driven means such that upon a predetermined speed of rotation of said driving means, said spring fingers under the influence of centrifugal action will contact with said release means to limit said driven means and when said driving means are disengaged from said driven means.

5. In a clutch assembly the combination of:
(a) rotatable driving means,
(b) rotatable driven means,
(c) a diaphragm spring member including a coned annular spring portion pivotally mounted on and rotatable with said driving means prestressed to normally operatively engage said driving means with said driven means and operably pivotal to a release position to disengage said driving means from said driven means,
(d) spring fingers integral with and depending from said coned annular spring portion in the direction of the apex of said coned annular spring portion,
(e) and each of said spring fingers having at least a major portion thereof bent out of the normal spring finger plane such that the center of gravity of each spring finger is disposed radially outside of the normal spring finger plane and to one side of a plane perpendicular to the axis of said coned annular spring portion passing through the pivot of said diaphragm spring member when said driving means are engaged with said driven means and when said driving means are disengaged from said driven means in said release position.

6. In a clutch assembly the combination of:
(a) rotatable driving means,
(b) rotatable driven means,
(c) a diaphragm spring member including a coned annular spring portion pivotally mounted on and rotatable with said driving means prestressed to normally operatively engage said driving means with said driven means and operably pivotal to a release position to disengage said driving means from said driven means,
(d) said coned annular spring portion having its apex to one side of a plane perpendicular to the axis of said coned annular spring portion passing through the pivot of said diaphragm spring member,
(e) spring fingers circumferentially disposed about and depending radially inward from said coned annular spring portion operable to pivot said diaphragm spring member to said release position,
(f) and each of said spring fingers having a greater portion thereof bent out of the normal spring finger plane such that the center of gravity of each spring finger is disposed radially outside of the normal spring finger plane and on said one side of the pivot of said diaphragm spring member when said driving means are engaged with said driven means and when said driving means are disengaged from said driven means in said release position so as to provide under the influence of centrifugal action, a centrifugal force acting on each of said spring fingers in a direction about the pivot of said diaphragm spring to aid in engagement when said driving means are normally engaged with said driven means and to promote reengagement when said driving means are disengaged from said driven means.

References Cited by the Examiner

UNITED STATES PATENTS

| | | | |
|---|---|---|---|
| 2,229,319 | 1/1941 | Wesselhoff | 192—89 |
| 2,399,886 | 5/1946 | Odevseff | 192—89 |
| 3,093,228 | 6/1963 | Binder | 192—89 |

OTHER REFERENCES

Kalversberg, German application 1,027,999, printed Apr. 10, 1958.

DAVID J. WILLIAMOWSKY, *Primary Examiner*.

UNITED STATES PATENT OFFICE

CERTIFICATE OF CORRECTION

Patent No. 3,235,049 February 15, 1966

Gibson O. Hufstader

It is hereby certified that error appears in the above numbered patent requiring correction and that the said Letters Patent should read as corrected below.

Column 2, line 43, for "releasing" read -- release --; column 3, line 15, for "diaphgarm" read -- diaphragm --; column 8, lines 74 and 75, strike out "said driven means and when said driving means are disengaged from said driven means" and insert instead -- the centrifugal force on each of said spring fingers --.

Signed and sealed this 7th day of February 1967.

(SEAL)
Attest:

ERNEST W. SWIDER
Attesting Officer

EDWARD J. BRENNER
Commissioner of Patents